J. R. LANE.
WINDOW CLEANER.
APPLICATION FILED DEC. 17, 1906.
948,631.
Patented Feb. 8, 1910.
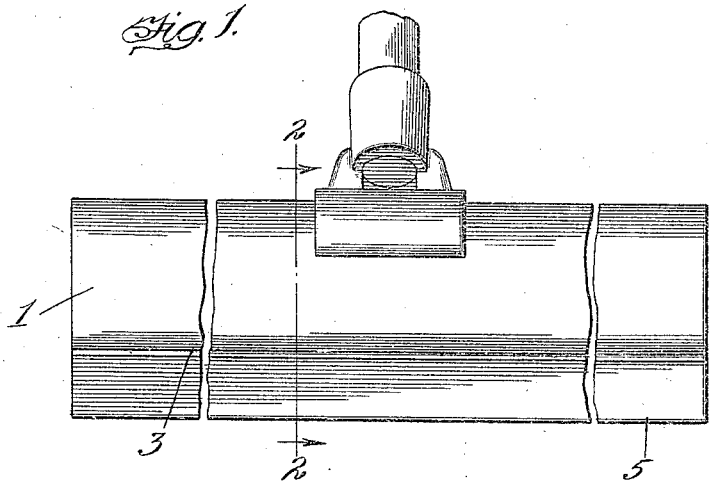
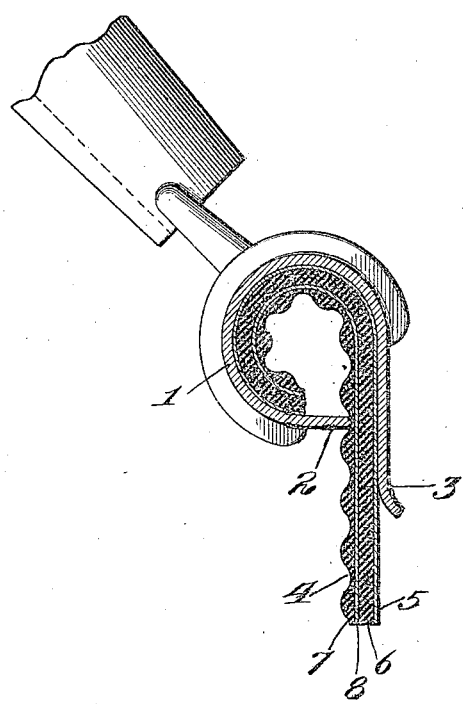
Witnesses:
Inventor:
Jas. R. Lane

UNITED STATES PATENT OFFICE.

JAMES R. LANE, OF LUDINGTON, MICHIGAN.

WINDOW-CLEANER.

948,631.  Specification of Letters Patent.   Patented Feb. 8, 1910.

Application filed December 17, 1906. Serial No. 348,142.

*To all whom it may concern:*

Be it known that I, JAMES R. LANE, a citizen of the United States, residing at Ludington, in the county of Mason and State of Michigan, have invented certain new and useful Improvements in Window-Cleaners, of which the following is a full, clear, and exact specification.

This invention relates to that class of window cleaners in which a strip of rubber is employed in a head or holder for wiping or cleaning the window or other surface on which it is to be used, and it has for its primary object to provide an improved and simple construction whereby the rubber may be adequately held in the head or holder and at the same time readily removed when desired for adjusting it or causing it to project farther from the holder as it wears away.

Another object of the invention is to provide an improved window cleaner of this character in which a rubber of a standard form may be employed, and a surplusage or store thereof contained within the holder to compensate for the wearing away of the contacting edge of the rubber.

With a view to the attainment of these ends and the accomplishment of certain other objects, which will appear hereinafter, the invention consists in the features of novelty which will now be described with reference to the accompanying drawing, and more particularly pointed out in the claims.

In the said drawing,—Figure 1 is a front elevation of a portion of a window cleaner embodying this invention. And Fig. 2 is a transverse section thereof on the line 2—2, Fig. 1.

1 is the head or holder, which is of tubular formation, with a flange 2 for engagement with the rubber, and preferably with a lip or reinforce 3, which extends below the flange for reinforcing or stiffening the rubber while in use, the lower edge of this lip 3 being turned outwardly as shown in Fig. 2, to prevent cutting the rubber where it bends backward. This tubular holder is of liberal dimensions transversely so as to afford ample room within it for a store or surplus of the rubber. The rubber itself is formed with a plurality of longitudinal corrugations 4, which of course constitute alternate ribs and grooves, these corrugations being formed on one side only, and into which grooves the flange or edge 2 of the holder engages for holding the rubber in place and pressing it firmly against the lip-stiffener 3, a strip of rubber of such width being used that the lower edge thereof will project the requisite distance below the lip 3, while the interior of the head is completely or substantially occupied by the upper edge of the rubber, curled up therein, as shown in Fig. 2. As the rubber wears away at the lower edge it is removed, preferably in a longitudinal direction, or lengthwise of the corrugations, and then slipped back again with the flange 2 in one of the grooves of the rubber farther up. It will also be seen that the ribs on the rubber constitute efficient wiping surfaces or projections appropriate for engagement with the glass or other surface to be wiped or cleaned, these ribs being presented in proper position for engagement with the window as the rubber bends backward against the lip 3, and consequently a new rubbing surface is always in readiness when the one immediately below wears away or is trimmed off, and all this is accomplished with a rubber of much less weight than one possessing uniform thickness and the same body and wearing qualities as the corrugated rubber.

If desired, the rubber may be backed with a backing or reinforce 5, composed of linen, canvas, or other suitable fabric, and in practice it is preferable to compose the rubber or wiper of two thicknesses of rubber. One of these is of plain or uniform thickness, 6, and the other the corrugated stratum 7, and these are secured together against a reinforce 8, which is composed of linen, canvas, or any other suitable fabric, thus making a strong and durable structure, and one free from liability of breaking or tearing from the continual bending against the lip 3.

In order that the invention might be understood by those skilled in the art, the details of this embodiment thereof have been thus specifically described, but

What I claim as new therein and desire to secure by Letters Patent is:

1. In a device for the purpose described, the combination of a rubber provided with a plurality of longitudinal corrugations and a holder having means adapted to project into any of the corrugations of the rubber for holding the rubber in place in the holder.

2. In a device for the purpose described, the combination of a holder having a flange, and a rubber provided with a plurality of corrugations into any of which the edge of said flange may enter to rest against the bottom of the corrugation for permitting adjustment of the rubber with respect to the holder and for holding the rubber in place.

3. In a device for the purpose described, the combination of a holder having a flange and a projecting lip situated at a distance from the flange and constituting a slot or passage in the holder, and a rubber having a plurality of corrugations, said rubber projecting through said slot, the edge of the flange being adapted to enter the corrugation and engage the bottom thereof.

4. In a device for the purpose described, the combination of a hollow holder having a slot, a corrugated rubber one end of which is coiled and located entirely within the holder, the other end projecting through said slot with the edge of the holder adjacent the slot engaging in and resting against the bottom of the corrugation.

5. In a device for the purpose described, the combination of a holder, a rubber having one end coiled and located entirely within the holder, the other end only projecting therethrough and constituting a wiping means, means engaging the rubber beyond the coiled end for holding the rubber in the holder, and means coöperating with the last said means for positively holding the rubber and holder against relative adjustment, said rubber being removable from the holder and adapted to be adjusted for compensating for the wearing away of its engaging face.

In testimony whereof I have signed my name to this specification, in the presence of two subscribing witnesses, on this 8th day of December, A. D. 1906.

JAMES R. LANE.

Witnesses:
ROBT. J. QUAIL,
HENRY C. HUTTON.